US008869052B2

(12) United States Patent  
Dattke

(10) Patent No.: US 8,869,052 B2  
(45) Date of Patent: Oct. 21, 2014

(54) CONTEXT-DEPENDENT OBJECT TYPES IN AN INTEGRATED DEVELOPMENT ENVIRONMENT

(75) Inventor: Rainer Andreas Dattke, Bruchsal (DE)

(73) Assignee: SAP SE, Walldorf (DE)

( * ) Notice: Subject to any disclaimer, the term of this patent is extended or adjusted under 35 U.S.C. 154(b) by 958 days.

(21) Appl. No.: 12/957,123

(22) Filed: Nov. 30, 2010

(65) Prior Publication Data

US 2012/0137268 A1      May 31, 2012

(51) Int. Cl.
*G06F 3/048* (2013.01)
*G06F 9/44* (2006.01)
*G06F 3/0481* (2013.01)

(52) U.S. Cl.
CPC .. *G06F 8/33* (2013.01); *G06F 8/38* (2013.01); *G06F 3/0481* (2013.01)
USPC .............................. 715/763; 715/762; 717/109

(58) Field of Classification Search
CPC ............ G06F 8/34; G06F 8/38; G06F 3/0481
USPC .............................. 717/101–178; 715/200–867
See application file for complete search history.

(56) References Cited

U.S. PATENT DOCUMENTS

| 5,794,001 | A  | * | 8/1998  | Malone et al. ................. 715/762 |
| 7,039,875 | B2 | * | 5/2006  | Khalfay et al. ............... 715/762 |
| 7,353,237 | B2 | * | 4/2008  | Birkenhauer et al. ................. 1/1 |
| 7,412,658 | B2 | * | 8/2008  | Gilboa .......................... 715/762 |
| 7,441,049 | B2 | * | 10/2008 | Chasman et al. ............. 709/248 |
| 7,574,689 | B2 | * | 8/2009  | Igelbrink et al. .............. 717/100 |
| 7,620,908 | B2 | * | 11/2009 | Klevenz et al. ................ 715/781 |
| 7,636,890 | B2 | * | 12/2009 | Marcjan et al. ............... 715/741 |
| 7,650,644 | B2 | * | 1/2010  | Cheng et al. .................... 726/27 |
| 7,681,176 | B2 | * | 3/2010  | Wills et al. .................... 717/109 |
| 7,716,681 | B2 | * | 5/2010  | Hackmann .................... 719/316 |
| 7,873,908 | B1 | * | 1/2011  | Varanasi et al. .............. 715/763 |
| 7,941,438 | B2 | * | 5/2011  | Molina-Moreno et al. ... 707/756 |

(Continued)

OTHER PUBLICATIONS

The GUISurfer Tool: Towards a Language Independent Approach to Reverse Engineering GUI Code—João Carlos Silva, Carlos Silva, Rui Gonçalo, João Saraiva, José Creissac Campos—Departamento de Informática/CCTC Universidade do Minho, Braga, Portugal—Departamento de Tecnologia Instituto Politécnico, Barcelos, Portugal—EICS'10, Jun. 19-23, 2010.*

(Continued)

*Primary Examiner* — Lewis A Bullock, Jr.
*Assistant Examiner* — Francisco Aponte
(74) *Attorney, Agent, or Firm* — Schwegman Lundberg & Woessner, P.A.

(57) ABSTRACT

A method is provided to display indicia of an object type for a service within a user interface of a software development system that runs on a computer, the method comprising: obtaining runtime context information that includes an identification of a respective service and an indication of a user role; providing a plurality of corresponding object types; using context dependent rules to determine which respective object types are within scope of a service; and generating a user interface that includes respective indicia of respective object types determined to be within the scope of the service.

13 Claims, 15 Drawing Sheets

(56) References Cited

U.S. PATENT DOCUMENTS

| | | | |
|---|---|---|---|
| 8,020,144 B2* | 9/2011 | Yang et al. | 717/106 |
| 8,042,099 B2* | 10/2011 | Drepper | 717/124 |
| 8,230,336 B2* | 7/2012 | Morrill | 715/261 |
| 8,381,306 B2* | 2/2013 | McPherson et al. | 726/27 |
| 2003/0227482 A1* | 12/2003 | Bach et al. | 345/762 |
| 2005/0235251 A1* | 10/2005 | Arend et al. | 717/104 |
| 2009/0164980 A1* | 6/2009 | Rossmann et al. | 717/128 |
| 2012/0029661 A1* | 2/2012 | Jones et al. | 700/17 |
| 2012/0041570 A1* | 2/2012 | Jones et al. | 700/17 |

OTHER PUBLICATIONS

JWalk: A tool for lazy, systematic testing of java classes by design introspection and user interaction—Anthony J.H. Simons—Department of Computer Science, University of Sheffield, Sheffield, UK—Sep. 8, 2007.*

* cited by examiner

Figure 2A

| Repository Browser | |
|---|---|
| Package ▼ | |
| SECE_TESTOBJECTS ▼ 🔍 | |
| ⬅ ➡ ⬇ ⬆ 🗂 🔄 ❎ | |
| Object Name | Description |
| ▼ 📁 SECE_TESTOBJECTS | Testobjekte in aust |
| ▶ 📁 Package Interfaces | |
| ▼ 📁 Embedded Packages | |
| ▶ 📁 SABAP_TESTOBJECTS | Testobjects |
| ▶ 📁 SACC_HOME | accessibility HOME |
| ▶ 📁 SAK_DEMO_ADDR_01 | demo |
| ▶ 📁 SAK_DEMO_ADDR_02 | demo |
| ▶ 📁 SDDIC_TESTOBJECTS2 | DDIC:testobjekte fü |
| ▶ 📁 SDKOM_UNSWITCHED | Unswitched packag |
| ▶ 📁 SEXIT_TESTOBJECTS | NWNY_AP7 |
| ▶ 📁 SMYENHPACKAGE | test |
| ▶ 📁 SRDTEST4 | test |
| ▶ 📁 SWB_CARTOOL_DEMO | Demo-Tools für die |
| ▶ 📁 Business Engineering | |
| ▶ 📁 Dictionary Objects | |
| ▼ 📁 Class Library | |
| ▶ 📁 Classes | |
| ▶ 📁 Interfaces | |
| ▶ 📁 Programs | |
| ▶ 📁 Function Groups | |
| ▶ 📁 Includes | |
| ▶ 📁 Web Dynpro | |
| ▶ 📁 BSP Library | |
| ▶ 📁 Enterprise Services | |
| ▶ 📁 Transactions | |
| ▶ 📁 Dialog Modules | |
| ▶ 📁 Logical Databases | |
| ▶ 📁 SET/GET Parameters | |
| ▶ 📁 Message Classes | |
| ▶ 📁 Form Objects | |
| ▶ 📁 Switch Framework Objects | |
| ▶ 📁 Test Objects | |
| ▶ 📁 Authorization Objs | |
| ▶ 📁 Selection Views | |
| ▶ 📁 Enhancements | |
| ▶ 📁 Check Configurations | |
| ▶ 📁 ITS Services | |
| ▶ 📁 Classifications | |
| ▶ 📁 Shared Objects Area Classes | |

Figure 3

CONTEXT-DEPENDENT OBJECT TYPES IN AN INTEGRATED DEVELOPMENT ENVIRONMENT

BACKGROUND

Integrated development environment (IDE) applications abstract the computer programming complexities and reduce software applications development time so as to enhance the productivity. An IDE allows a developer to concentrate more on the functionality of the application that is being created rather than concentrating on the writing code. An IDE may include a variety of components such as a source code editor, a compiler or interpreter, build automation tools, and a debugger and tools to build an executable, for example. Versioning control may be included to assist computer programmers manage the history of the development objects, e.g. source code. An IDE for object-oriented programming (OOP) often includes a class browser, tools to produce class hierarchy diagrams, and an object inspector, for example. An IDE can assist a developer in developing applications by allowing him to easily drag and drop objects onto a 'form' or onto a 'canvas' of the application that is under development. Thus, a developer may be required to write fewer lines of code, which reduces the time required to create an application. An IDE may combine several editor tools, each tool tailored to process objects of a specific type. State-of-the-art IDEs often provide plug-in options which allow users or commercial developers to integrate external tools and new object types.

However, not all of tools, object types and operations are intended to be used by anybody, anywhere. Depending upon user authorizations, user role, system configuration, client-specific customizing and other context information, access to certain types and operations and tools may be forbidden or restricted. FIGS. 1 and 2A-2B provide illustrative examples of user interfaces that are not especially well matched to the particular context in which they are used.

FIG. 1 is an illustrative drawing of a user interface screen display indicating that a user lacks authorization to 'Save' a class object. In this example, the user interface screen display is part of an object editor (software) tool that requires a user to have authorization to use it. Unfortunately, in this example, an authority check is implemented in the actual tool, and a restriction is not evident until the user tries to call the tool or worse, until the user tries to complete an already initiated operation. Specifically, in this example, the user called a function on the object type 'class'. The user seeks to create a new class object type named 'CL_0815'. In this example, only after the user has entered the object name and perhaps other information relating to the new class object and then selects 'Save', does a notification pop up to indicate that the user lacks authorization to create the new class object. Thus, the user's prior efforts to create a new class object are for naught, which is frustrating to the user. From a usability standpoint, this user interface behavior is quite poor because the authority restrictions are communicated too late.

Figure 2A:
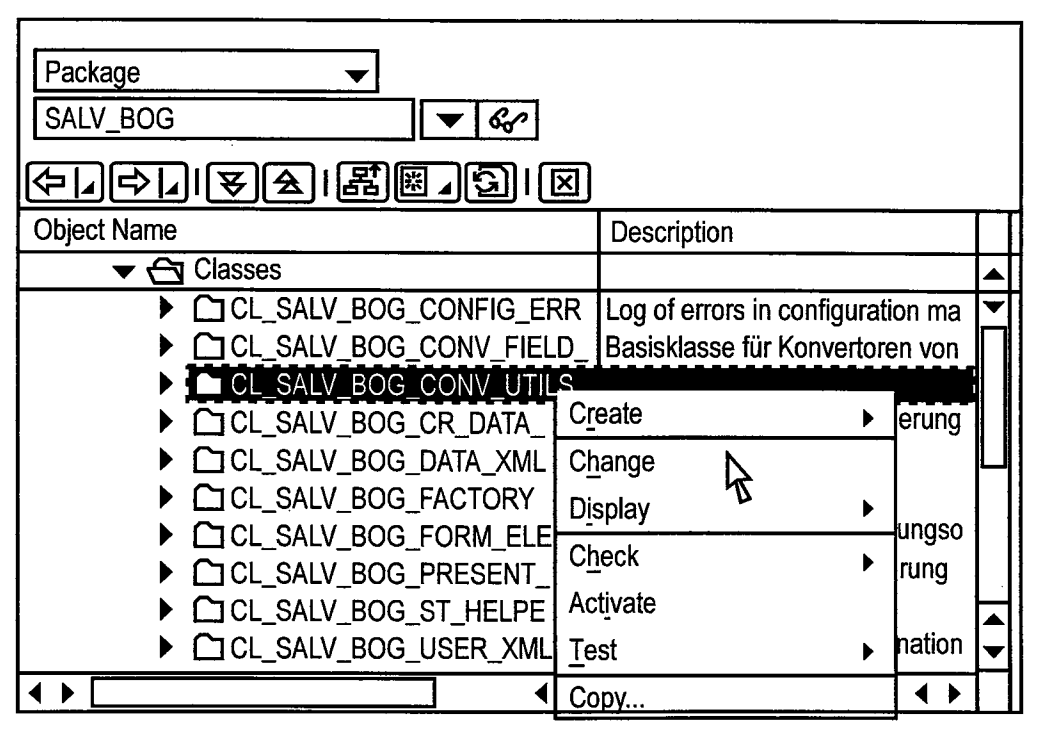

FIGS. 2A-2B are illustrative drawings of user interface screen displays that include a menu (FIG. 2A) that offers a 'Change' operation and a warning (FIG. 2B) indicating that the 'Change' operation is not authorized. In this example, the user does not learn that he is not authorized to use the 'Change' operation until after he has selected it. User interface behavior is disappointing because authority restrictions are communicated to late.

FIG. 3 is an illustrative drawing of a user interface screen display showing a package list collection of object types contained within a 'Package', in which the 'Check Configuration' object type is not prominently displayed. The example package list is hierarchical. The root object type is 'Package', and the 'Check Configuration' object type is at the same hierarchy level as many other object types below the root. A certain object type or operation can be of particular importance for some users, roles or authorization groups, but not for others or it can be of high relevance in a certain system configuration or in a specific instance (client/tenant) of the system, but not in another system context or system instance. For users in some roles such as quality manager, for example, the 'Check Configuration' object type may be more important, and for ease of use it may be more convenient to such users to display that object type more prominently.

With the increasing complexity of IDEs, there has been a need for improvement in the ability to flexibly generate different user interface displays for use within an IDE that support differences in the availability and prominence of the displays of different object types and operations to different users in different situations.

SUMMARY

In one aspect, a method is provided to display indicia of an object type for a service within a user interface of a software development system. In another aspect, a method is provided to display a user interface menu within a user interface of a software development system. In yet another aspect, a method is provided to display indicia of an object type within a hierarchical user interface of a software development system. Runtime context information is used in concert with information structures in computer readable storage device that indicate context information dependent rules to determine a display to be generated. A user interface display is generated consistent with the runtime context and context dependent rules.

These and other features and advantages will be understood from the following detailed description of embodiments in conjunction with the appended drawings.

BRIEF DESCRIPTION OF THE DRAWINGS

FIGS. 2A-2B are illustrative drawings of user interface screen displays that include a menu (FIG. 2A) that offers a 'Change' operation and a warning (FIG. 2B) indicating that the 'Change' operation is not authorized.

FIG. 3 is an illustrative drawing of a user interface screen display showing a package list, a collection of object types contained within a package, in which the 'Check Configuration' object type is not prominently displayed in accordance with some embodiments.

DESCRIPTION OF EMBODIMENTS

The following description is presented to enable any person skilled in the art to create and use a computer system configuration and related method and article of manufacture to enable different object types, object type operations and object type display presentations within different contexts. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Introduction

In accordance with some embodiments, object types are comprehensively specified at design time. An object type specification designates applicable functional scope and operations, as well as requirements to access operations on an object type. An object type specification also may include options and conditions for displaying on the UI.

At runtime, the IDE uses the object type specifications in conjunction with runtime context information (e.g., system, client, user profile, object state) to determine the availability of object types, specific objects and operations. The availability is checked before those entities (types, objects, and operations) are presented on screens or in menus. Based upon the availability of object types, objects and operations, the IDE flexibly and dynamically generates situation-specific screens and menus. Generation of user interface displays once a determination of object types or elements to be represented in the user interface is well known to persons skilled in the art and is not described in detail herein.

Example User Interface Screen Displays

Figure 1:
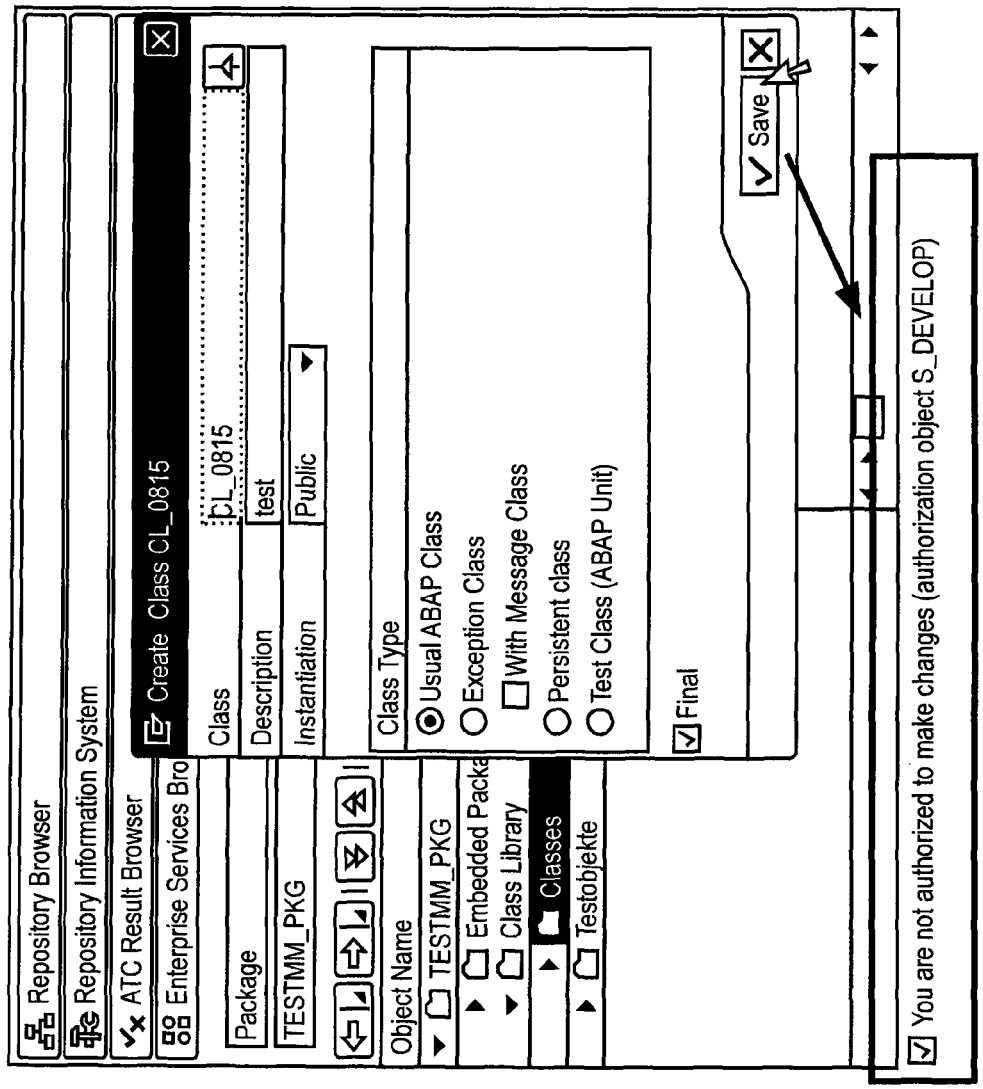
FIG. 1 is an illustrative drawing of a user interface screen display indicating that a user lacks authorization to 'Save' class object.
Figure 2B:
Figure 4:
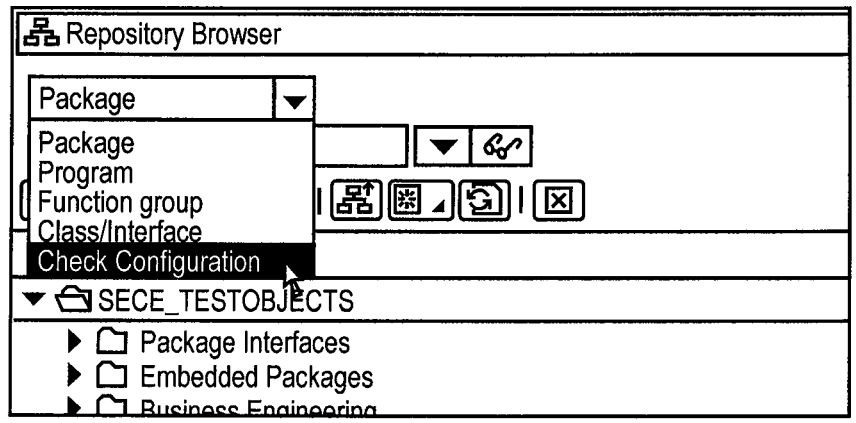
FIGS. 4-7 are illustrative drawings of user interface screen displays showing variations of the display of a 'Check Configuration' object type dependent upon user role in accordance with some embodiments.
Figure 5:
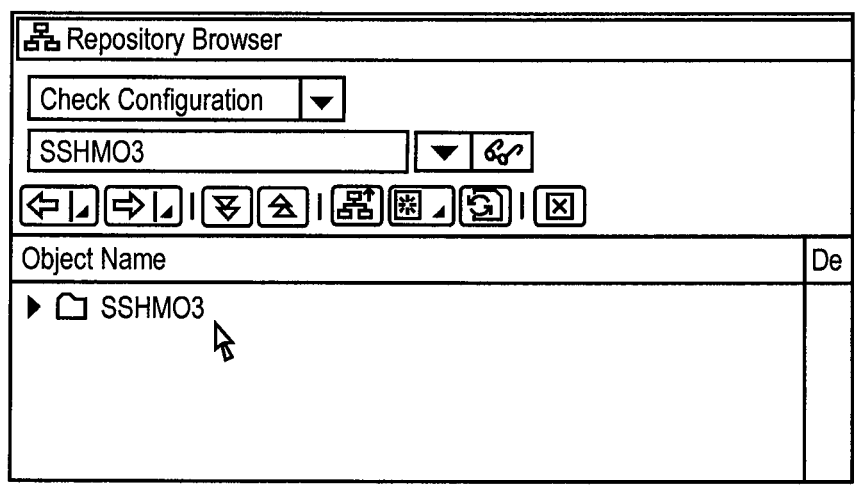
Figure 6:
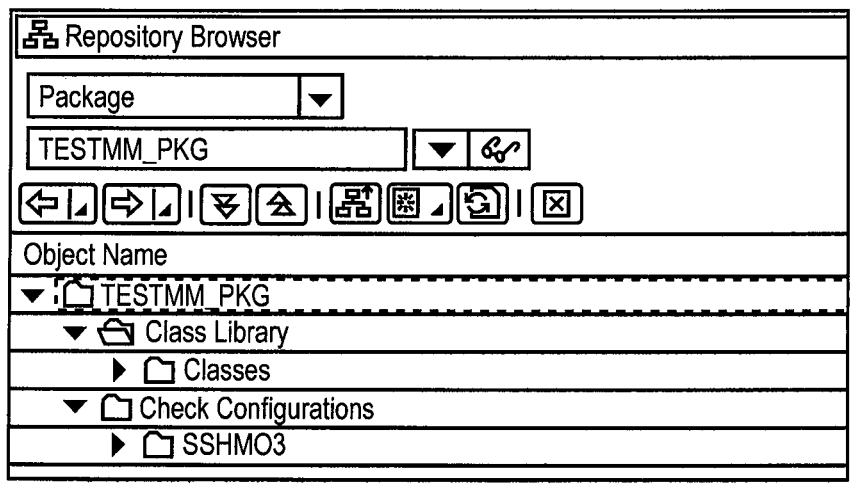
Figure 7:
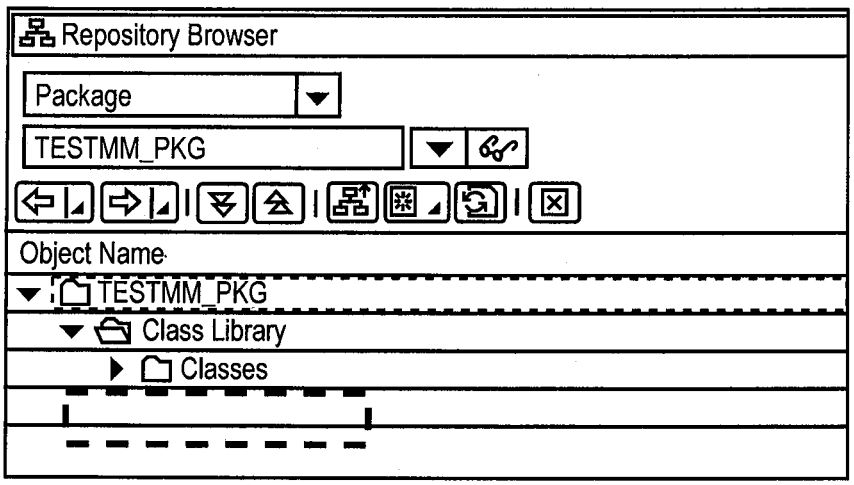

FIGS. 4-7 are illustrative drawings of user interface screen displays showing variations of the display of a 'Check Configuration' object type dependent upon user role in accordance with some embodiments. The screen display of FIG. 4 is presented to users in the quality manager role in which the Check Configuration object type is presented not only as an element of the package list, but also within a top-level root of independent object lists in the hierarchy of object types. The Check Configuration object type is highlighted signifying that the user, a quality manager, has selected this object type from a dropdown list box. FIG. 5 shows the screen display that is generated in response to a user's selection of Check Configuration in FIG. 4, in which Check Configuration is at a root level of the object hierarchy. The screen display of FIG. 6 is presented to users in the developer role for whom the Check Configuration object type is not as important. Consequently, the Check Configuration object type is displayed less prominently, lower in the hierarchy, underneath the package node, which serves as a root in this user interface object hierarchy. The screen display of FIG. 7 is presented to users in the customer role who do not have authorization to use the Check Configuration object type, which is omitted from the screen display as represented by the dashed lines enclosing an empty region.

Figure 8:
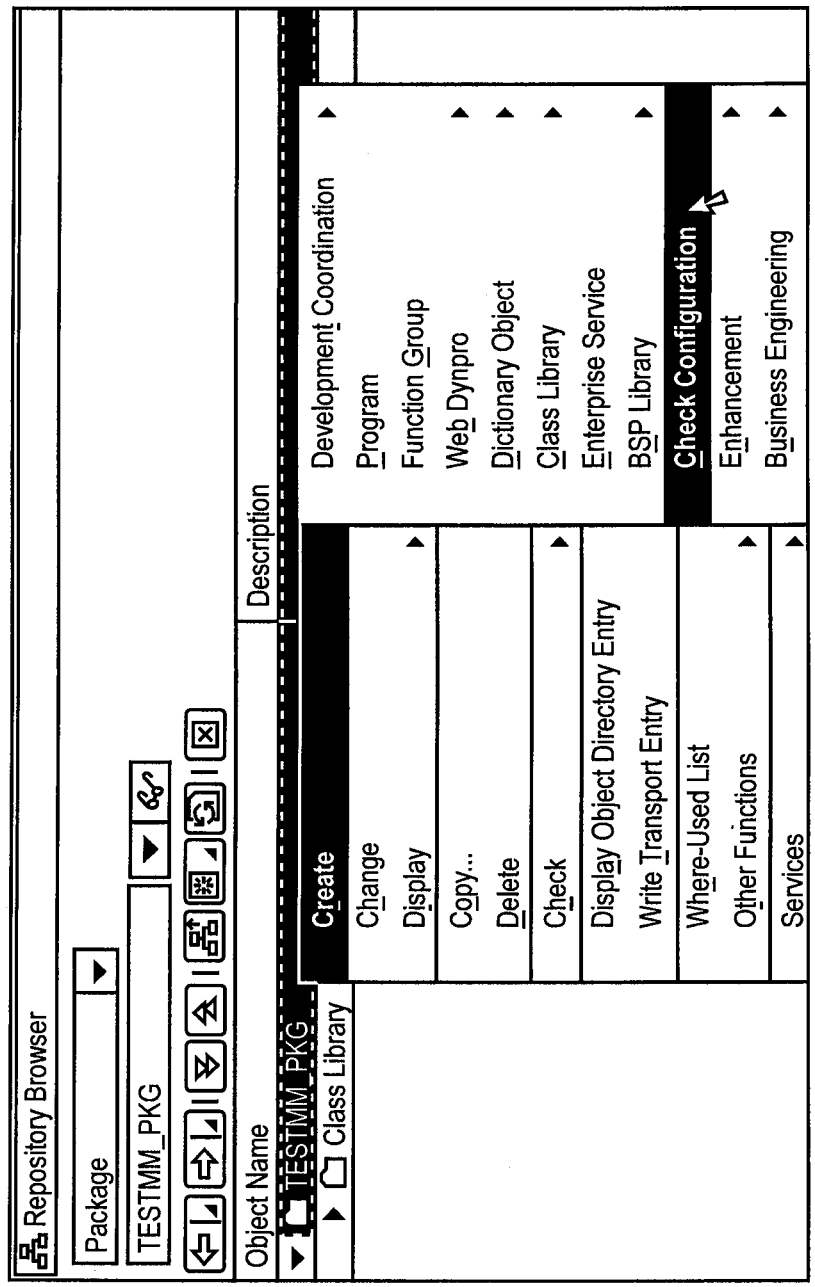
FIGS. 8-10 are illustrative drawings of user interface menu screen displays showing variations of the display of an offering of the 'Create' operation dependent upon user role in accordance with some embodiments.
Figure 9:
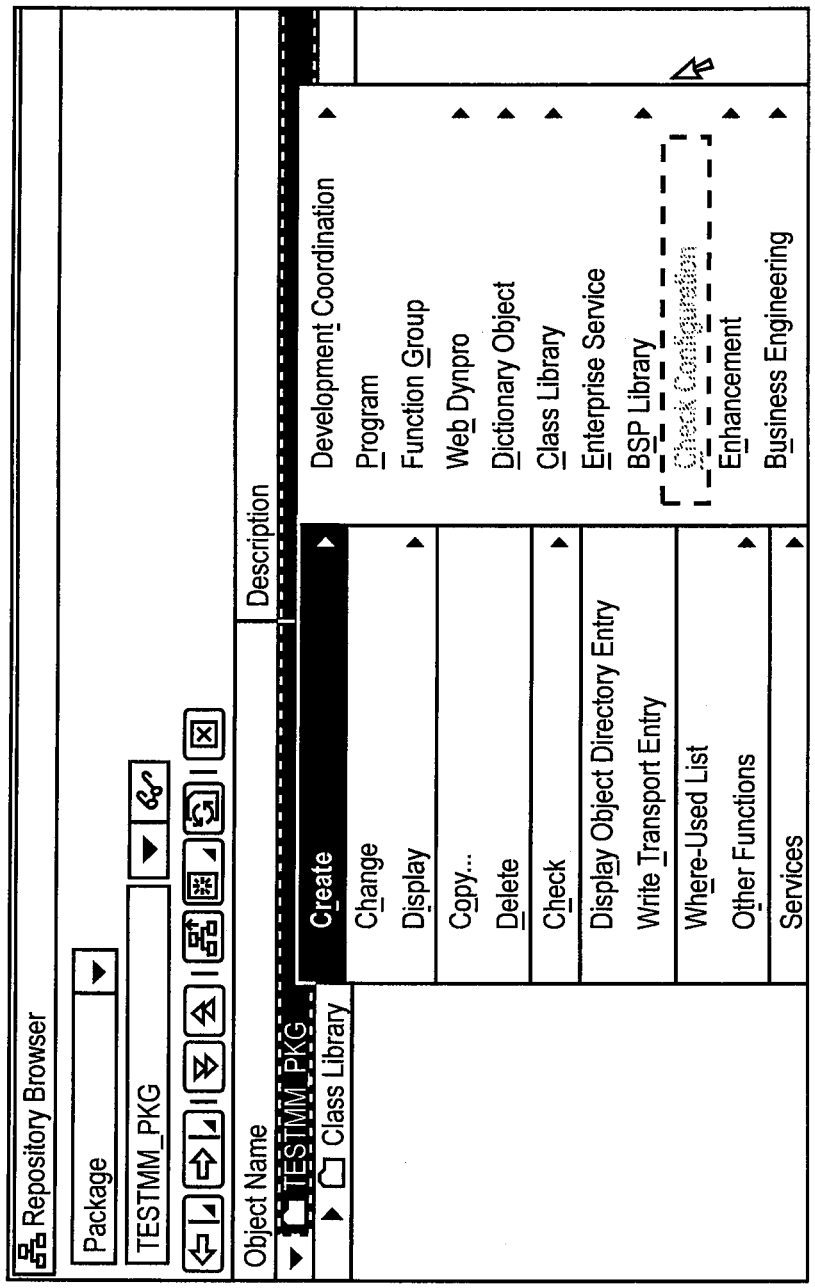
Figure 10:
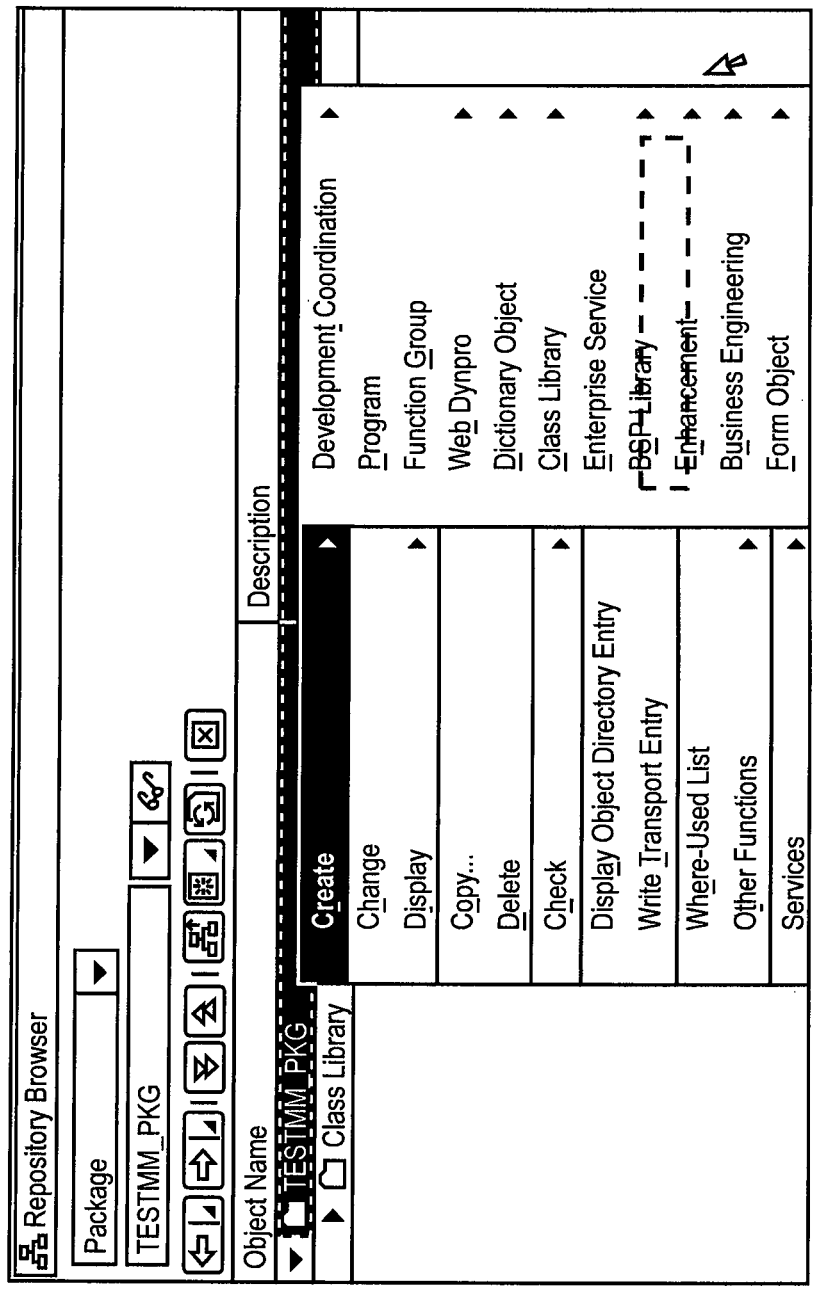

FIGS. 8-10 are illustrative drawings of user interface menu screen displays showing variations of the display of an offering of the 'Create' operation dependent upon user role in accordance with some embodiments. The menu of screen display of FIG. 8 shows that for users in the quality manager role, a menu display is generated in which the Create operation is available for use with the Check Configuration object type. The menu of screen display of FIG. 9 shows that for users in the developer role, a menu display is generated in which the Create operation is visible but disabled, indicated by the dimmed/grayed out word within the dashed lines. The menu of screen display of FIG. 10 shows that for users in the customer role, a menu display is generated in which the Create operation is not available and not visible but disabled, indicated by the empty region within the dashed lines.

Process Overview

Figure 11:
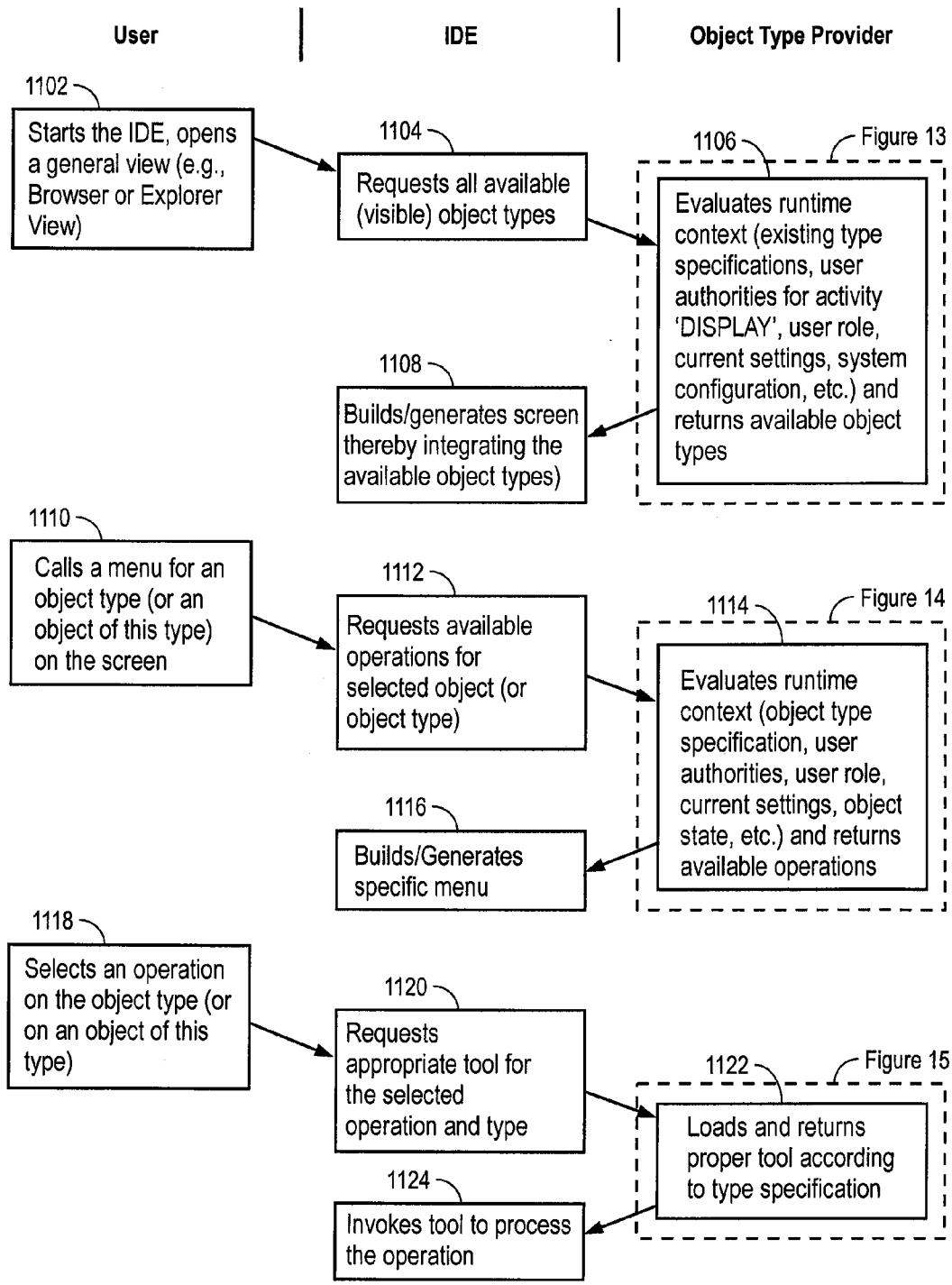
FIG. 11 is an illustrative flow diagram representing interaction between a user, an integrated development environment (IDE) and an object type provider (OTP) in accordance with some embodiments.

Object type definitions are provided that set forth runtime context dependent rules for the use of object types in an IDE. Runtime criteria may include user role, system configuration, user authority for a particular operation, for example. FIG. 11 is an illustrative flow diagram representing interaction between a user, an integrated development environment (IDE) and an object type provider (OTP) in accordance with some embodiments. The OTP acts as an interface between the IDE and the object type definitions. But the Object Type Provider is more than a simple API ('Application Programming Interface'); it also evaluates the dynamic availability and significance of the individual object types by accounting for the complex runtime situation. A machine is configured according to program code to act as an IDE that is responsive to user commands. The machine is further configured according to program code to act as an object type provider that is responsive to the IDE. It will be appreciated that although the OTP and IDE are shown as separate components, the OTP may be implemented as integral with the IDE.

A characteristic of an IDE is that it provides an infrastructure, in general a set of services, which eases the development process and supports the user. These services refer to 'functional scopes' such as 'Active/Inactive Handling', 'Version Management', 'Transport Management', 'Where-used list'. Functional scopes are rather coarse-grained entities, whereas the operations (or 'functions') are rather fine-grained entities: For example, the functional scope 'Version Management' includes operations such as 'Display version', 'Compare versions', 'Retrieve version'. Object type definitions specify to which of the services or functional scopes an object type may be associated, and which of the operations may be applicable to the object type.

An OTP is programmatically integrated at many locations in the source code of the IDE, these locations representing 'functional scopes'. Then, at runtime, the OTP dynamically determines the availability, visibility and UI presentations of the object types, objects and operations. These determinations depend upon context information indicative of the current (dynamic) situation, e.g., user profile, user authorizations, system or client customizing and settings (e.g., switch settings), object state (locked, saved, active/inactive), hardware or software parameters, backend engine, etc. With the aid of the OTP, the IDE generates menus and screens.

At runtime, the process of FIG. 11 evaluates pre-defined object type definitions in view of runtime context information to determine the availability of object types, operations that can be performed on those object types and the position of visible indicia of those object types in a display screen. In user block 1102, a user requests to start the IDE and opens a general view or display screen, e.g. a browser view. In response to the user request, IDE block 1104 requests from the OTP all available (i.e. visible) object types. In response to the IDE request, OTP block 1106 evaluates runtime context (e.g., object type specifications; user authorities for the activity 'DISPLAY'; user role; system configuration; etc.) and returns the available object types. IDE block 1108 generates a user interface screen that displays indicia of the object types available to the user. In user block 1110, the user requests a menu for an object type shown on the screen display. In response to the user request, IDE block 1112 requests from the OTP available operations for the selected object type. In response to the IDE, OTP block 1114 evaluates runtime context (e.g., object type specification; user authorities; user role; object state; etc.) and returns available operations. IDE block 1116 generates the specific menu using the returned operations. In user block 1118, the user selects an operation on the object type. In response to the user request, IDE block 1120 requests from the OTP the appropriate tool for the selected operation and object type. In response to the IDE request, OTP block 1122 loads and returns the proper tool according to the type specification. IDE block 1124 invokes the returned tool to process the selected operation.

Object Type Data Model Structure

Figure 12A:
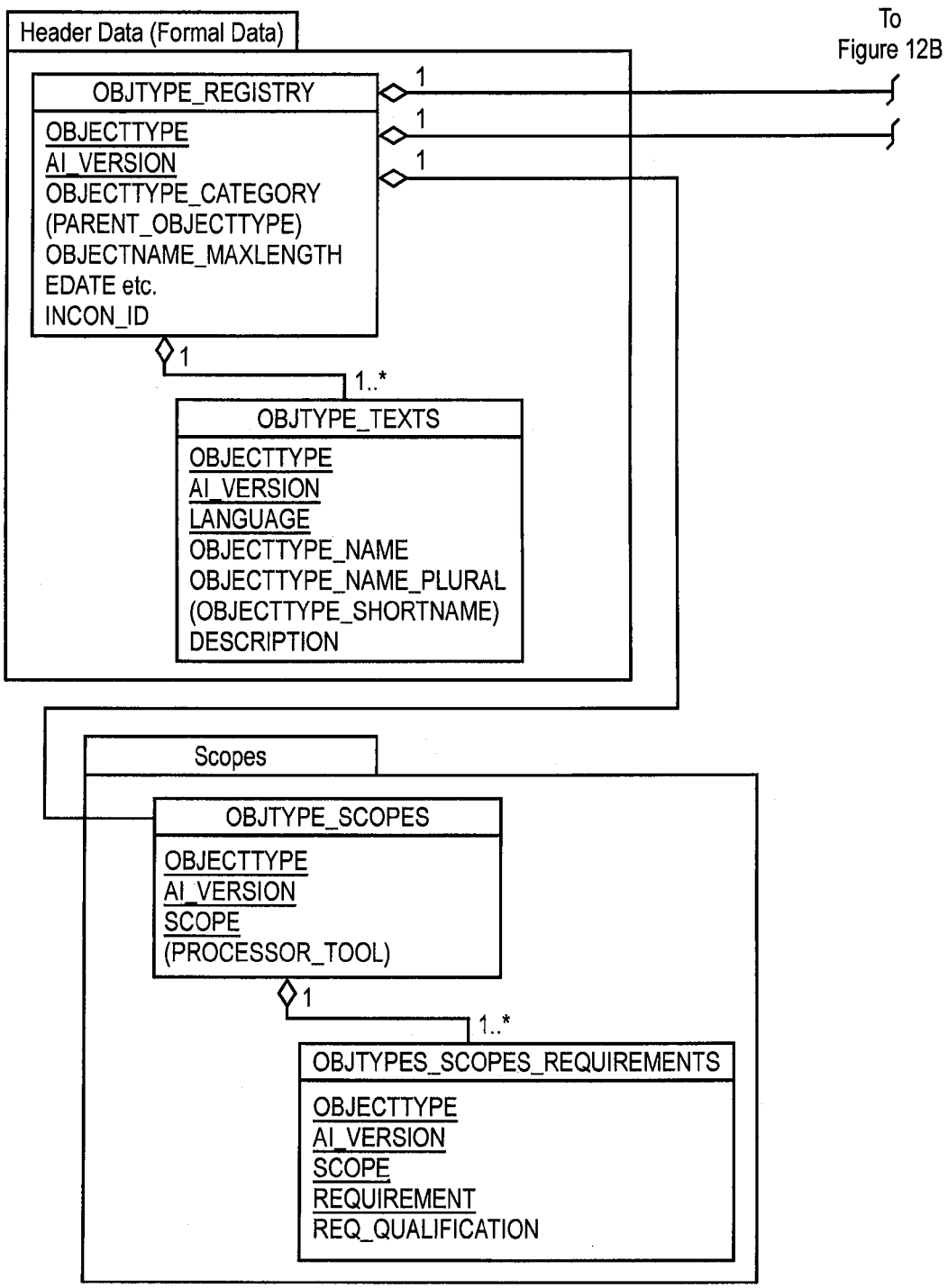
FIGS. 12A-12B provide an illustrative drawing of an object type data model information structure in accordance with some embodiments.
Figure 12B:
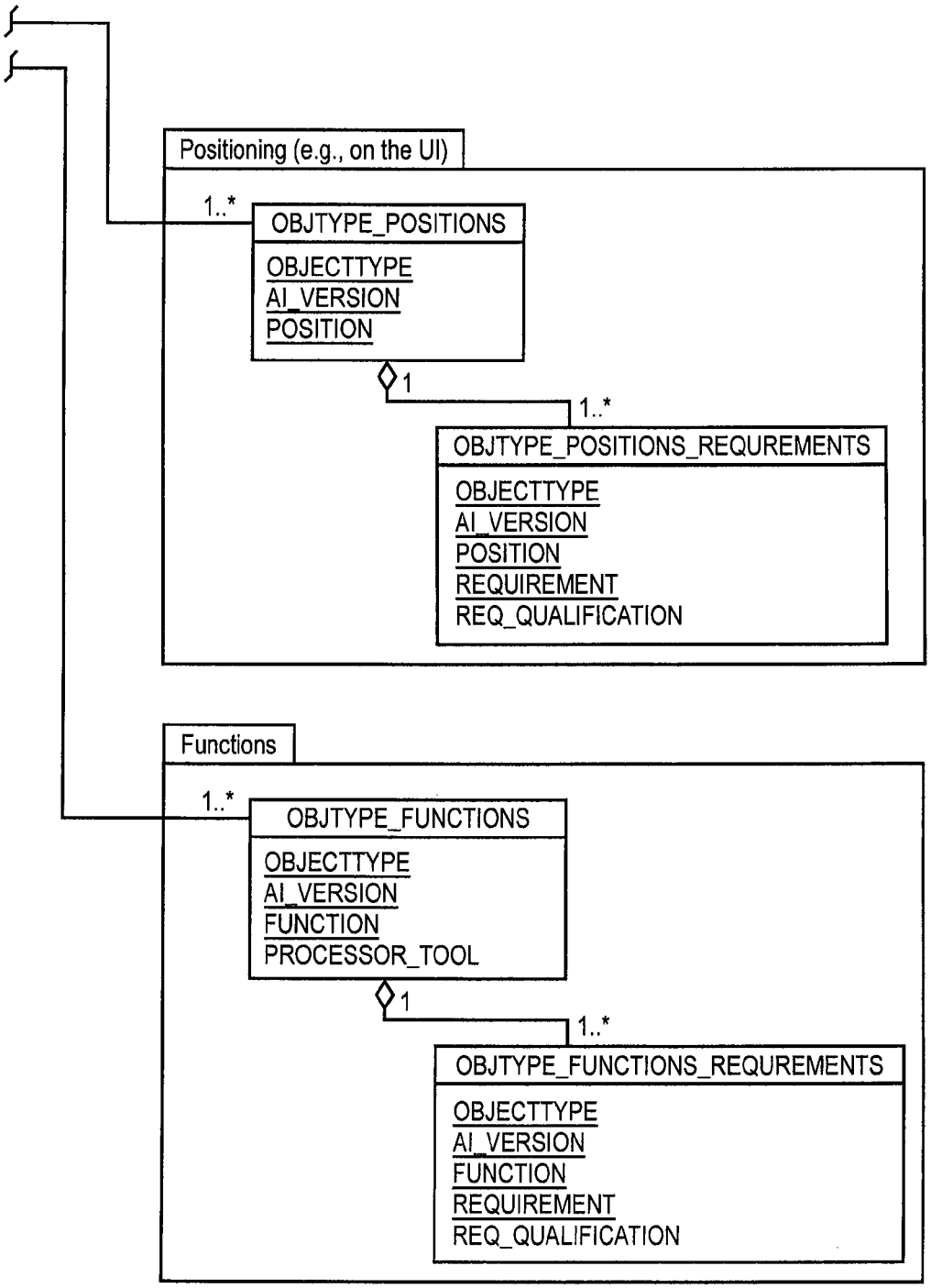

FIGS. 12A-12B provide an illustrative drawing of an object type data model information structure in accordance with some embodiments. The illustrative example data model comprises multiple table structures stored in a computer readable storage device. A plurality of object types filed in the illustrated data model structure are used to generate a context dependent user interface that provides context dependent object types and context dependent operations and context dependent display of indicia (e.g., icons) that visually represent the object types and operations.

As explained in the following paragraphs, each object type specification may provide context dependent rules that determine what shall be referred to herein as a 'functional scope' to which the object type is connected; may provide context dependent operations that are applicable on the object type; and may provide context dependent information that determines where (positioning e.g. within a hierarchy) and how prominently the object type is to be presented in an output device, e.g. a user interface display. These object type data (scope, operations, positioning) may be coupled (as part of an overall object type specification) to some context-based requirements or conditions that are checked/evaluated at runtime to determine whether a given object type is within the scope of the request, to determine which operations are to be offered, and to determine positioning of indicia of the object type and the operations offerings within the output.

The example object type data model structure includes an OBJTYPE_REGISTRY table and an OBJTYPE_TEXTS table that provide what shall be referred to herein as formal data that provide general information concerning the object type and its display. In the illustrated embodiment, the OBJTYPE_REGISTRY structure provides a technical name for the object type, which may involve a multi-component key (e.g., transporttype+subtype), an edit date (EDATE) and identification of an icon (i.e. pictogram) to act as visual or graphical indicia of the object in a user interface display screen. In the illustrated embodiment, the OBJTYPE_TEXTS structure provides a display name for the object type. In some embodiments, a language-dependent text table is provided that contains the object type name in different languages and character sets, in different grammatical cases (e.g., singular and plural, nominative case, accusative case), and with different character lengths (to cope with different field lengths on the UI). The IDE uses these name-related data to generate certain screen displays and menu displays that incorporate visual indicia (e.g., an icon representing the object type). In some embodiments, an object type may be declared to be 'normal', 'abstract' and/or 'derived'. Moreover, an object type may be derived from another type (which may be 'abstract' or not). In order to derive an object type, the 'parent' object type must be named. (Derived data can be 'redefined' or 'overwritten'.) Furthermore, an object type may belong to a category or class of object types, or may be part of a type hierarchy.

The OBJTYPE_SCOPES table and the OBJTYPES_SCOPES_REQUIREMENTS table provide first data sets that provide 'coarse' ('high-level') rules for control or filtering of the context-dependent functional scope that is enabled for the object type. The functional scope signifies services or areas or components of the IDE where an object type may be integrated: 'Active-/Inactive Handling', 'Version Management', 'Transport Management', 'Where-used list', etc. A functional scope also may signify a 'hidden' (or 'dark') function, such as 'Automatic Backup', where objects of the given type are to be involved but are not directly accessible to the user and may have no corresponding visual indicia in a UI display. For example, an object type that is defined to be picked up in the 'Automatic Backup' job of the IDE. For a common developer, this batch job has no visibility on the UI.

Table 1 provides example detailed rules that may be provided within the OBJTYPE_SCOPES table structure and within the OBJTYPES_SCOPES_REQUIREMENTS table structure of FIGS. 12A-12B. Scope requirements information provided in the OBJTYPES_SCOPES_REQUIREMENTS table corresponds to information provided in the first and second columns of Table 1. The first and second columns of Table 1 respectively indicate functional scopes in which the object type may be available and conditions or requirements for availability within a given functional scope. For example, referring to the first data-containing row of Table 1, the example object type is available within the functional scope, 'Active-/Inactive Handling', provided that the condition that the current user is in the 'Developer' role is satisfied. In this example, 'Active/Inactive Handling' is a functional scope. When no requirements are defined for a certain scope (e.g., 'Transport Management'), then the object type has unconditioned access to that scope. Processor tool information provided in the OBJTYPE_SCOPES table corresponds to the third column of Table 1, which indicates the processor tool provided within each functional scope. Thus, the example OBJTYPE_SCOPES table structure and the OBJTYPES_SCOPES_REQUIREMENTS structure determine the context-dependent conditions in which a given object type may be available within a given functional scope and also determine the processor tool(s) available for use with the object type within that functional scope.

Note that in the middle column of the Table 1, the "Required User Role" is one example for a context-dependent requirement.

TABLE 1

| Functional Scope | Required User Role | Processor Tool |
|---|---|---|
| Active-/Inactive Handling | Developer | CL_XTYPE_EDITOR |
| Where-used list / Infosystem | | CL_XTYPE_INFOSYST |
| Dequeue/Enqueue (Locking) | Developer | CL_XTYPE_EDITOR |
| Logging, History | Quality Manager | CL_XTYPE_EDITOR |
| Versioning | | CL_XTYPE_LM |
| Upgrade | | CL_XTYPE_LM |
| Automatic testing | Quality Manager | CL_XTYPE_EDITOR |
| Customizing | Developer | CL_XTYPE_EDITOR |
| Transport Management | | CL_XTYPE_LM |

A 'processor tool' is the software tool to be called by the runtime environment in order to process the object type in the context of the respective 'Functional Scope'.

Typically, a processor tool is decoupled from the IDE framework. Upon a request, the IDE framework searches through some registry to determine the right tool. (For example, in order to display some 'Graphical Model' object, the appropriate processor tool will be a 'Graphical Editor'.) In the present embodiments described herein, the object type specifications include information on the processor tools; the set of object type specifications therefore implicitly establishes a tool registry. In an alternative embodiment, the processor tools might be registered separately from the object type specifications.

In an object-oriented programming language, such a processor tool or editor is a class which implements a certain interface. The runtime environment will call the tool class via the interface. For any 'Functional Scope', an individual tool (or a shared tool) may be registered as processor tool.

The OBJTYPE_FUNCTIONS and OBJTYPE_FUNCTIONS_REQUIREMENTS tables provide second data sets that provide rules for 'finer' ('lower-level') control or filtering of context-dependent operations that are enabled for the object type. The example second data set identifies context-dependent operations associated with the object type and the conditions or requirements under which the operations are available to be accessed used. Table 2 provides example detailed information that may be provided within the OBJTYPE_FUNCTIONS and the OBJTYPE_FUNCTIONS_REQUIREMENTS table structures of FIGS. 12A-12B. In some embodiments, a first data set such as that of Table 1 is used to determine whether a given object type is within the scope of some service, component or area of the IDE for a given context. Assuming that the object type is within the scope, then a second data set such as that of Table 2 is used to determine which operations associated with the object type are available for the given context.

The first and second columns of Table 2 respectively indicate operations that are available and conditions for availability. For example, referring to the second, data-containing row of Table 2, the example operation, 'DISPLAY', is available provided that the condition "User has authorization S_DEVELOP" is satisfied. (A user role is associated with a distinct set of authorizations. An authorization may refer to an "authority object" and an "activity". The IDE may check whether the current user (in his current role) has the required authorization.)

A combination of context-dependent conditions (linked with 'AND' or 'OR', or combinations) may be specified for an operation. Requirements may include user authorization level, hardware parameters or the existence/installation of a certain backend software engine, for example.

For example, consider the operation 'EXECUTE', which means to execute specific objects of the given type. (Example: To 'execute' a compiled program means to run the program.) A context-dependent rule for the EXECUTE operation may involve two requirements specified in an object type specification:

1.) The user account must have some technical authorization in the software system, characterized by some authority object 'S_DEVELOP' and activity 'EXECUTE'.

2.) The kernel of the runtime system must be of version x.4.1 or higher.

Both conditions may be defined and linked with 'AND' in the object type definition at design time. At runtime, the system will evaluate them. The result is that operation/function 'EXECUTE' will be available (e.g. visible and selectable) on the User Interface only if both conditions are fulfilled at runtime.

Note that in some embodiments, requirements may be specified as being "mandatory", or "sufficient", which is roughly equivalent to combining requirements with 'AND' or 'OR'.

The third column of Table 2 indicates whether at runtime indicia of the object type or operation is visible on the user interface when the context condition is not satisfied and the operation is unavailable. For example, indicia of the 'DISPLAY' operation is visible even if the 'DISPLAY' operation is unavailable, but indicia of the 'CREATE', operation is not visible if the 'CREATE' operation is unavailable. Note that information in the third and fourth columns 'Display Mode' and 'Processor Tool' is not required to determine whether condition-dependent operations are available. The 'Display Mode' can be defined as a general setting (which holds for any operation, or even for any object type); the 'Processor Tool' may already be defined with respect to the 'Functional Scope', i.e. on a higher level (so there might be no need to override it here).

In Table 2, the second column "Required Authorization" is one example for a context-dependent requirement.

TABLE 2

| Operation | Required Authorization | Display Mode (if unavailable) | Processor Tool |
|---|---|---|---|
| DISPLAY | S_DEVELOP | Visible but disabled (i.e., not selectable) | CL_XTYPE_EDITOR |
| CREATE | S_DEVELOP | Not visible | CL_XTYPE_EDITOR |
| CHANGE | S_DEVELOP | Not visible | CL_XTYPE_EDITOR |
| ACTIVATE | S_DEVELOP | Not visible | CL_XTYPE_EDITOR |
| DELETE | S_DEVELOP | Not visible | CL_XTYPE_EDITOR |
| WHERE_USED | S_DEVELOP | Not visible | CL_TYPE_INFO |
| EXECUTE | S_FCONSUMER | Not visible | CL_XT_PROCESSOR |

The OBJTYPE_POSITIONS and OBJTYPE_POSITIONS_REQUIREMENTS tables provide third data sets that provide rules for control or filtering of context-dependent UI display presentation (e.g. position) of visible indicia of a given object type. The example third data set identifies context-dependent object type display presentations and the conditions that determine which presentation is generated. Table 3 provides example detailed information that may be provided within the OBJTYPE_POSITIONS and the OBJTYPE_POSITIONS_REQUIREMENTS table structures of FIGS. 12A-12B. The Table 3 example refers to general views, i.e. views of sets of object types, as shown in 'Browsers'. Moreover, positions may be characterized by abstract 'Levels', or by technical identifiers (e.g., 'Root node in Explorer Tree'). In the Table 3 example, the importance of a certain object type is relative, since it depends on the role or profile of a user, or on other parameters. Accordingly, the object type is to be presented more or less prominently within a set of object types on the UI depending upon a user's role.

In Table 3, the second column "Required User Role" is one example for a context-dependent requirement.

TABLE 3

| Display Position | Required User Role |
| --- | --- |
| Top Level | Quality Manager |
| Standard Level | Developer |
| ... | ... |

It will be appreciated that some object types may require categories of information in addition to that shown in the data model of the general structure shown in FIGS. 12A-12B in order to instantiate the object type. For example, the access of an object type to 'functional scope' Active-/Inactive Handling may require further, detailed data such as a list of dependent object types (i.e., objects which have to be activated synchronously with objects of the present type); Activation phase at runtime where objects of the present type have to be activated (e.g., 'Pre-Activation' or 'Standard Activation' or 'Post-Activation'). As another example, access of an object type to 'functional scope' Transport Management may require further, detailed data such as to indicate whether objects of this type are to be automatically transported to other systems in the 'transport landscape', or manually transported; to indicate whether this is a main transport type, or a subordinate transport type (The latter means: Objects of this type are transported as a part of another object.); and to indicate the 'transport layer' in which objects of this type are transported. As yet another example, access of an object type to 'functional scope' Where-Used list may require further, detailed data such as which objects (object types) may be used by objects of the present type and which objects (object types) may use objects of the present type.

In some embodiments an Object Type Editor tool is provided to support persons who design object types and object type specifications. By providing admission control, edit locks, automatic entry help and entry checks, as well as comprehensive checks, an Object Type Editor tool can assure that object type specifications are consistent, plausible and complete. In general, 'functional scope', operations/functions and UI positioning for a given object type are interdependent. The Object Type Editor can check for any conflicts. For example, an object type which allows operation Transport should have access to the 'functional scope' 'Transport Management'. Object types can be comprehensively specified at design time. Authority checks and other availability checks at runtime can be delegated from the tools to the 'Object Type Provider'. In effect, the object types and tools in the IDE can be centrally controlled, and the usability of the IDE is improved. Screens and menus on the User Interface are more homogeneous.

An alternative object oriented programming approach to comprehensively specifying scope, operations and/or presentation of an object type is to represent object type specifications as classes implementing well defined interfaces. At design time, comprehensive properties of an object type are written in the source code of such a class. In this alternative embodiment there is no need for a specific editor tool for object types.

Example OTP interaction with Object Type Definitions

Figure 13:
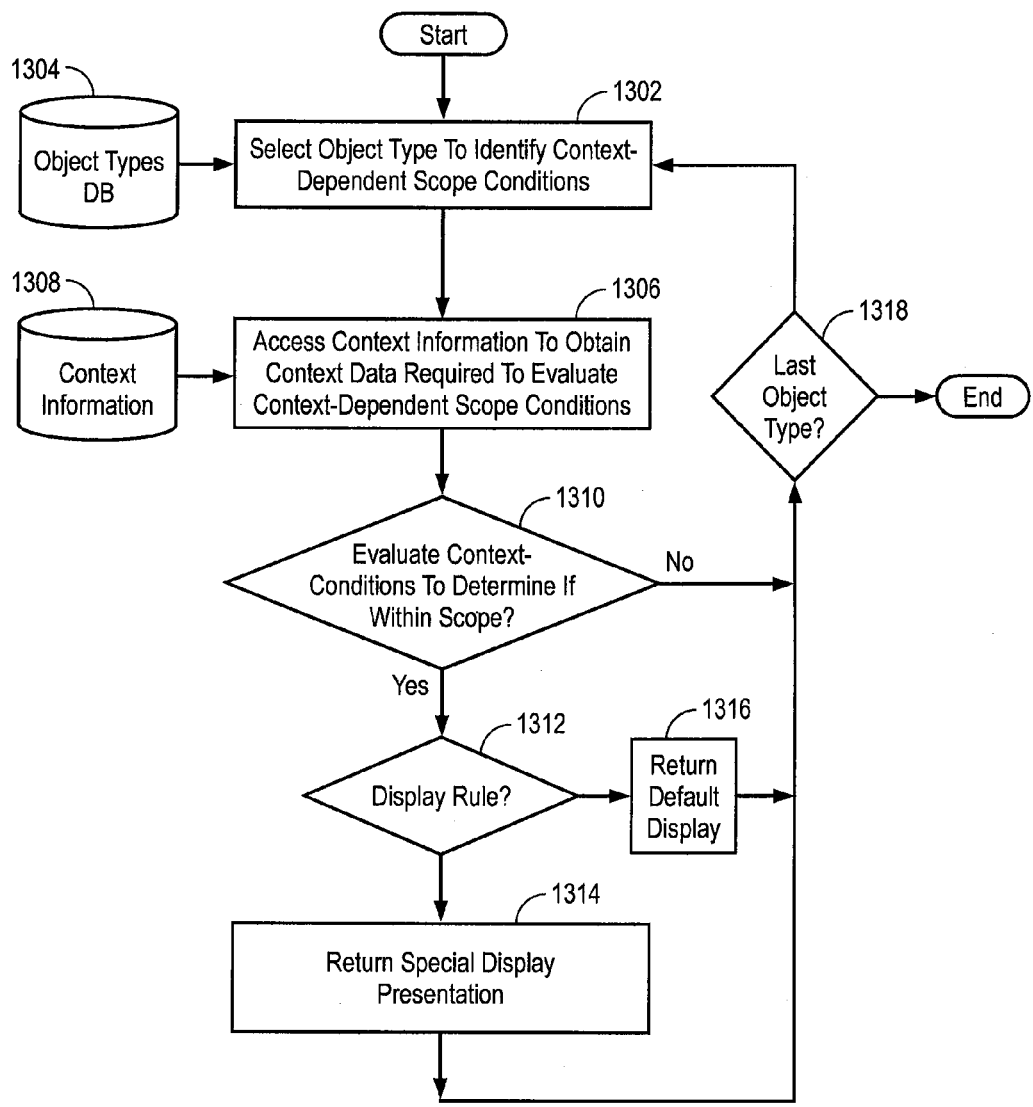
FIG. 13 is an illustrative flow diagram showing details of a first OTP process in accordance with some embodiments.
Figure 14:
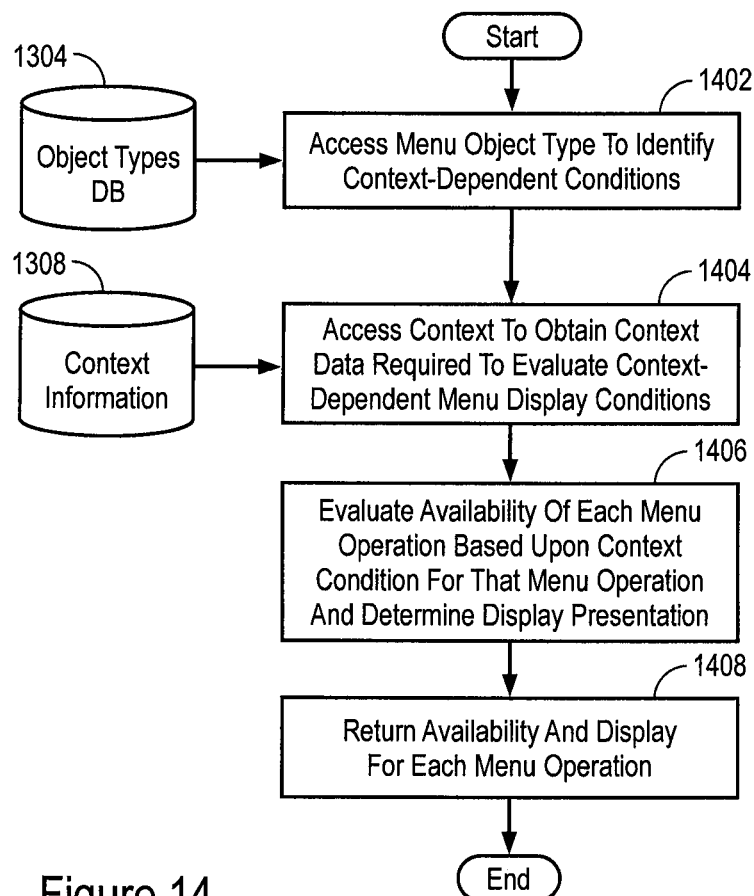
FIG. 14 is an illustrative flow diagram showing details of a second OTP process in accordance with some embodiments.
Figure 15:
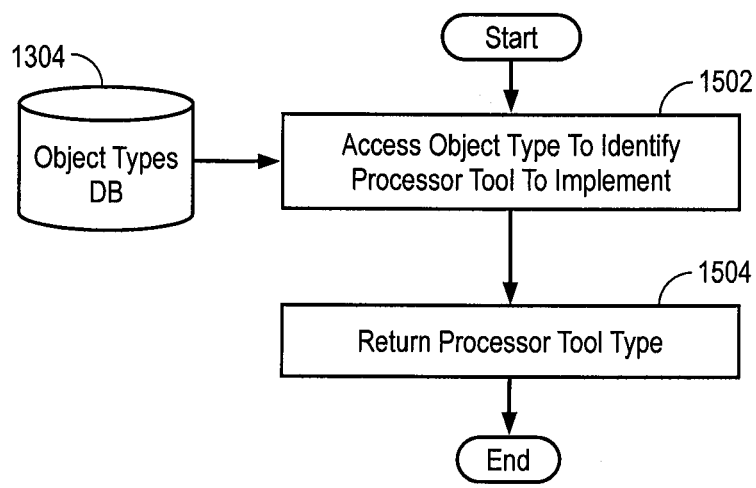
FIG. 15 is an illustrative flow diagram showing details of a third OTP process in accordance with some embodiments.

Referring again to FIG. 11, additional illustrative details of the process of block 1106 are shown in FIG. 13. Additional illustrative details of the process of block 1114 are shown in FIG. 14. Additional illustrative details of the process of block F22 are shown in FIG. 15.

More particularly, FIG. 13 is an illustrative flow diagram showing details of a first OTP process performed in response to an IDE block 1104 requests for all available (i.e. visible) object types. It will be understood that a machine may be configured with program code to implement acts represented by the illustrative modules of FIG. 13. In response to a request from the IDE, which is responsive to a user request to start a service, for example, module 1302 accesses a corresponding object type definition from an object type definition database 1304, which stores a multiplicity of object type definitions. Referring to FIGS. 12A-12B, module 1302 uses OBJTYPE_REGISTRY table information to retrieve the object type definition. Module 1306 accesses saved context information 1308 to obtain context data that is required to evaluate the context-dependent scope conditions within the OBJTYPE_SCOPES table and the OBJTYPES_SCOPES_REQUIREMENTS table of the selected object type definition. As explained below, the context information is not persistently stored, but rather is saved only temporarily. Decision module 1310 evaluates the context-dependent conditions specified by the object type definition for the selected object type to determine whether the selected object is within the scope function.

Note that the object type information in definition database 1304 is persistently stored, whereas the context information 1308 relates to the runtime situation (e.g., system state, date, time, user role, etc.) which comprises transient data. If decision module 1310 determines that the selected object type is within the functional scope, then decision module 1312 evaluates context-dependent conditions specified by OBJTYPE_POSITIONS and OBJTYPE_POSITIONS_REQUIREMENTS tables of FIGS. 12A-12B in view of context information to determine whether a special display rule is to be applied to the selected object type. If decision module 1312 determines that a special display rule is to be applied to the selected object type, then module 1314 returns the selected object type and the special display rule to the IDE module 1108, which integrates the selected object type into generation of the user interface in accordance with the special display rule. Referring to Table 3, for example, the special rule might specify that the object type is to be displayed as the root node in the tree. If decision module 1312 determines that no special display rule is to be applied, then module 1316 returns the selected object type and a default display rule to the IDE module 1108, which integrates the selected object type into generation of the user interface in accordance with the default display rule. Following a determination by decision module 1310 that the selected object type is not within the functional scope, a return by module 1314 or a return by module 1316, whichever the case, decision module 1318 determines whether the last object type has been evaluated for it's being within the functional scope. If not, then control flows back to module 132 and the process repeats. If decision module 1318 determines that all object types to be evaluated have been evaluated, then the process ends.

Referring again to FIGS. 4-7, for example, the first OTP process of FIG. 13 can be used to determine whether and where a 'Check Configuration' object type is incorporated within a user interface. For the illustrative user interface of FIG. 4, for example, decision module 1310 would have determined that the 'Check Configuration' object type is within the functional scope; decision module 1312 would have determined that a special display rule applies to the 'Check Configuration'; and module 1314 would have returned to the IDE indications that the 'Check Configuration' object type is to be displayed according to the special display rule. In the case of the example user interface of FIG. 4, the special display rule specified that the 'Check Configuration' object type is to be displayed in a top level of a display hierarchy.

Referring to the user interface display screen of FIG. 6, for example, decision module 1310 would have determined that the 'Check Configuration' object type is within the functional scope; decision module 1312 would have determined that no special display rule applies; and module 1314 would have returned to the IDE indications that the 'Check Configuration' object type is to be displayed according to a default display rule. Accordingly, the example user interface of FIG. 6, displays the 'Check Configuration' object type in a lower level of a display hierarchy beneath the package node.

Referring to the user interface display screen of FIG. 7, for example, decision module 1310 would have determined that the 'Check Configuration' object type is within the functional scope; decision module 1312 would have determined that a special display rule applies; and module 1314 would have returned to the IDE indications that the 'Check Configuration' object type is to be displayed according to a special display rule. in this example, the special display rule specifies that the 'Check Configuration' object type is not to be visible at all in the user interface. Accordingly, the example user interface of FIG. 6, omits the 'Check Configuration' object type altogether.

FIG. 14 is an illustrative flow diagram showing details of a second OTP process performed in response to an IDE block 1112 requests for available (i.e. visible) menu operations for a selected object type. It will be understood that a machine may be configured with program code to implement acts represented by the illustrative modules of FIG. 14. In response to a request from the IDE, which is responsive to a user request for a menu relating to an object type, for example, module 1402 accesses a corresponding object type definition from the object type definition database 1304. Referring to FIGS. 12A-12B, module 1402 uses OBJTYPE_REGISTRY table information to retrieve the object type definition. Module 1404 accesses stored context information 1308 to obtain context data that is required to evaluate the context-dependent scope conditions within the OBJTYPE_FUNCTIONS table and the OBJTYPES_FUNCTIONS_REQUIREMENTS table of the selected object type definition for the selected object type to determine which operations associated with the selected object type are available within the current context. Module 1406 evaluates the availability of each menu operation associated with the selected object type based upon the current context condi-tions associated with that operation. Module 1406 also may evaluate display presentation of the operations. Module 1408 returns to the IDE indications of the availability of the menu operations and their display within the user interface.

Referring again to FIGS. 8-10, for example, the second OTP process of FIG. 14 can be used to determine whether the 'Create' operation is available for the 'Check Configuration' object type within different contexts. For the illustrative user interface screen display of FIG. 8, for example, decision module 1406 would have determined that the 'Create' operation is available for the 'Check Configuration' object type within the context given for the user interface of FIG. 8, which includes a user in the role of quality manager. Module 1408 would have returned to the IDE indications that the 'Create' operation is to be displayed in a menu of operations for the 'Check Configuration' object type. Referring to the user interface display screen of FIG. 9, for example, module 1406 would have determined that the 'Create' operation is not available for the 'Check Configuration' object type within the context given for the user interface of FIG. 9, which includes a user in the role of developer. Module 1406 also would have determined that the 'Create' operation is to be displayed with indicia that it is unavailable (i.e., displayed as grayed-out or dimmed). Referring to the user interface display screen of FIG. 10, for example, module 1406 would have determined that the 'Create' operation is not available for the 'Check Configuration' object type within the context given for the user interface of FIG. 10, which includes a user in the role of customer developer. Module 1406 also would have determined that the 'Create' operation is not to be displayed. In FIG. 10, the absence of any visible indicia of the (unavailable) 'Create' operation is indicated by the empty space enclosed within the dashed lines.

FIG. 15 is an illustrative flow diagram showing details of a third OTP process performed in response to an IDE block 1120 requests for performance of menu operations for a selected object type. It will be understood that a machine may be configured with program code to implement acts represented by the illustrative modules of FIG. 15. In response to a request from the IDE, which is responsive to a user request to perform an operation indicated in a menu of operations, module 1502 accesses a corresponding object type definition from the object type definition database 1304. Referring to FIGS. 12A-12B, module 1502 uses OBJTYPE_REGISTRY table information to retrieve the object type definition. Module 1502 accesses the OBJTYPE_SCOPES table and the OBJTYPES_SCOPES_REQUIREMENTS table or accesses the OBJTYPE_FUNCTIONS table and the OBJTYPE_FUNCTIONS_REQUIREMENTS table of the retrieved object type definition for the selected object type to determine which processor tool is associated with the selected operation. Module 1504 returns to the IDE an indication of the processor tool to be used to perform the selected operation.

Hardware Environment

Figure 16:
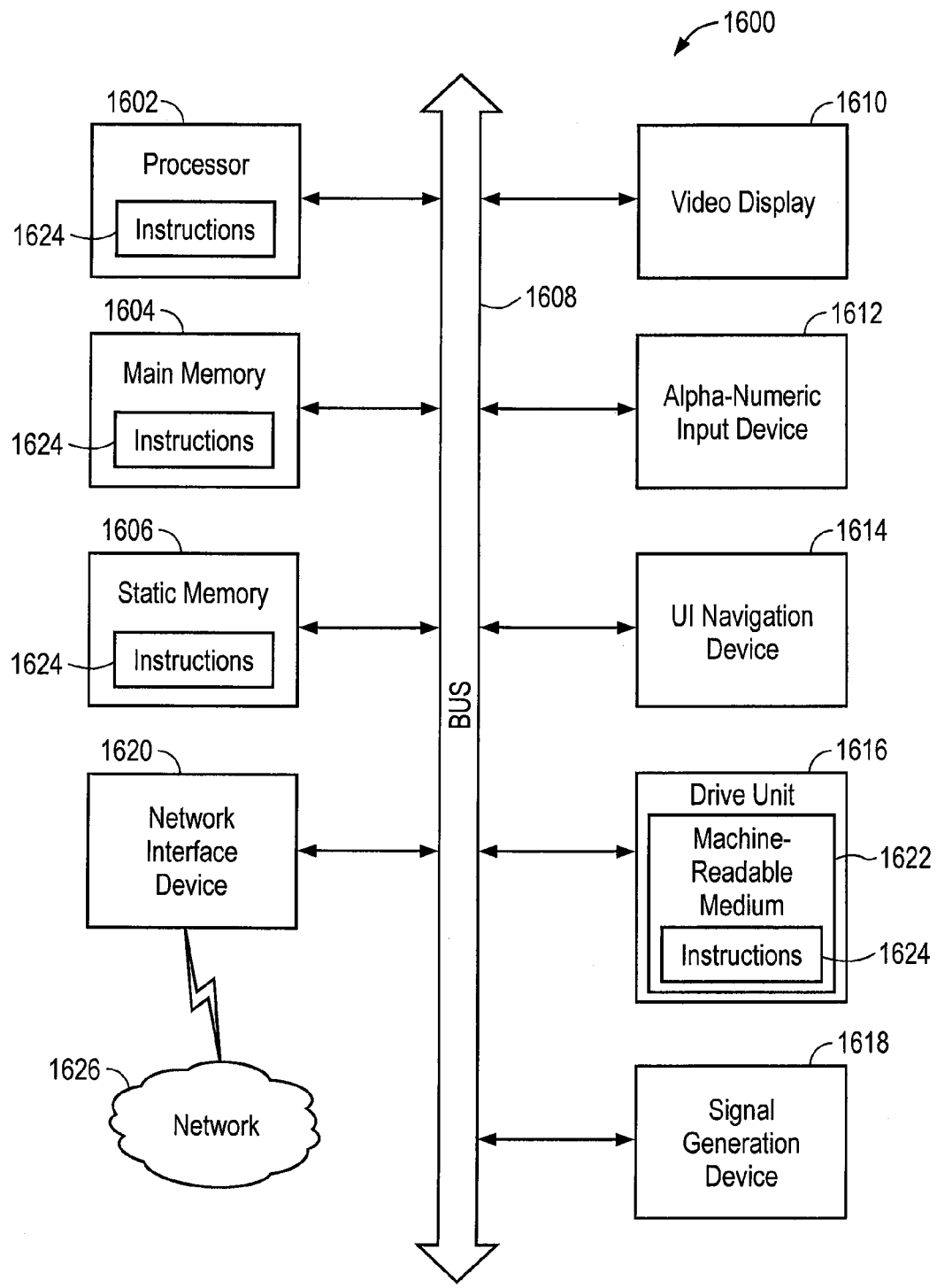
FIG. 16 is a block diagram of a computer processing system within which a set of instructions, for causing the computer to perform any one or more of the methodologies discussed herein, may be executed.

FIG. 16 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1600 includes processor 1602 (e.g., a central processing unit (CPU), a graphics processing unit (GPU) or both), main memory 1604 and static memory 1606, which communicate with each other via bus 1608. The processing system 1600 may further include video display unit 1610 (e.g., a plasma display, a liquid crystal display (LCD) or a cathode ray tube (CRT)). The processing system 1600 also includes alphanumeric input device 1612 (e.g., a keyboard), a user interface (UI) navigation device 1614 (e.g., a mouse, touch screen, or the like), a mass storage disk drive unit 1616, a signal generation device 1618 (e.g., a speaker), and a network interface device 1620.

The disk drive unit 1616 includes computer-readable medium 1622 on which is stored one or more sets of instructions and data structures (e.g., software 1624) embodying or utilized by any one or more of the methodologies or functions described herein. The software 1624 may also reside, completely or at least partially, within the main memory 1604 and/or within the processor 1602 during execution thereof by the processing system 1600, the main memory 1604 and the processor 1602 also constituting computer-readable, tangible media.

Object types database 1304 may be stored persistently in mass storage 1304, for example. Context information 1308 can be saved in main memory 1604, for example. Program code corresponding to processes of FIGS. 11 and 13-15 may be encoded in main memory 1604 when the processes run on processor 1602, for example.

The software 1624 may further be transmitted or received over network 1626 via a network interface device 1620 utilizing any one of a number of well-known transfer protocols (e.g., HTTP).

While the computer-readable medium 1622 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The invention claimed is:

1. A method to display indicia of an object type for a service within a user interface of a software development system that runs on a computer comprising:

obtaining runtime context information that includes an identification of a respective service and an indication of a user role;

providing in a non-transitory computer readable storage device an object type information structure that includes, a plurality of respective first object types that correspond to respective visual indicia in the user interface and that indicate respective context information dependent rules for determining whether to include display of the respective visual indicia in a user interface, a plurality of respective second object types that correspond to respective user menu operations associated with respective visual indicia in the user interface and that indicate respective context information dependent rules for determining whether to include display of the respective user menu operations in a user interface, and a plurality of respective third object types that indicate respective context information dependent rules for display position of the respective visual indicia and/or for display position of the respective menu operations in a user interface;

using a computer to apply the runtime context information to the respective context dependent rules indicated within the object type information structure to determine which respective visual indicia to display, to determine which menu operations to display and to determine positions of one or more of the visual indicia and menu operations in a user interface; and generating a user interface that displays the visual indicia and the menu operations and their positions according to the determinations made using the runtime context information and the respective context dependent rules;

wherein generating the user interface includes generating a display that includes one or more user menu operations in response to receiving user input indicating user selection of a respective displayed visual indicia.

2. The method of claim 1 further including:

omitting from the generated user interface respective visual indicia that correspond to respective first object types that were not determined, according to the context information dependent rules for determining whether to include display of the respective visual indicia in a user interface, to be within the scope of the identified service.

3. The method of claim 1,
wherein the information structure associates respective first object types with respective services and with respective processing tools that correspond to respective services; and further including:
receiving a user selection of a respective visual indicia indicated within the generated user interface that corresponds to a respective first object type; and
using the computer to access the respective corresponding first object type and to call a respective processing tool associated with corresponding first object type by the information structure to correspond to the identified service.

4. The method of claim 1, wherein the generated user menu includes at least one indication that a respective user operation is determined to not be available for the indicated user role.

5. The method of claim 1 further including:
omitting from the generated user menu at least one indication of a respective user operation not determined to be available for the indicated user role.

6. The method of claim 1, wherein the information structure associates respective processing tools with respective operations; and further including: receiving a user selection of a respective menu operation displayed within the generated user interface; and using the computer to access a respective information structure to identify a respective processing tool associated with the selected operation and to call the respective identified processing tool.

7. The method of claim 1,
wherein generating the user interface includes generating the visual indicia in a first determined position in response to first context information and generating the visual indicia in a second determined position in response to second context information.

8. An article of manufacture that includes a non-transitory computer readable storage device encoded with program code to cause a computer system to perform a process that includes:
obtaining runtime context information that includes an identification of a respective service and an indication of a user role;
providing in non-transitory a computer readable storage device an object type information structure that includes,
a plurality of respective first object types that correspond to respective visual indicia in the user interface and that indicate respective context information dependent rules for determining whether to include display of the respective visual indicia in a user interface,
a plurality of respective second object types that correspond to respective user menu operations associated with respective visual indicia in the user interface and that indicate respective context information dependent rules for determining whether to include display of the respective user menu operations in a user interface, and
a plurality of respective third object types that indicate respective context information dependent rules for display position of the respective visual indicia and/or for display position of the respective menu operations in a user interface;
using a computer to apply the runtime context information to the respective context dependent rules indicated within the object type information structure to determine which respective visual indicia to display, to determine which menu operations to display and to determine positions of one or more of the visual indicia and menu operations in a user interface; and
generating a user interface that displays the visual indicia and the menu operations and their positions according to the determinations made using the runtime context information and the respective context dependent rules;
wherein generating the user interface includes generating a display that includes one or more user menu operations, according to the context information dependent rules for determining whether to include display of the respective user menu operations in a user interface, in response to receiving user input indicating user selection of a respective displayed visual indicia.

9. The article of manufacture of claim 8,
wherein generating the user interface includes generating a menu operations available for the indicated user role, in response to receiving user input indicating user selection of a respective displayed visual indicia, displaying one or more menu operations according to a determination made using the runtime context information and the respective context dependent rules.

10. The article of manufacture of claim 8,
wherein generating the user interface includes generating the visual indicia in a first determined position in response to first context information and generating the visual indicia in a second determined position in response to second context information.

11. A computer system comprising:
a processor;
a storage device to store instructions that, when executed by the processor cause the processor to:
obtain runtime context information that includes an identification of a respective service and an indication of a user role;
provide in a non-transitory computer readable storage device an object type information structure that includes,
a plurality of respective first object types that correspond to respective visual indicia in the user interface and that indicate respective context information dependent rules for determining whether to include display of the respective visual indicia in a user interface,
a plurality of respective second object types that correspond to respective user menu operations associated with respective visual indicia in the user interface and that indicate respective context information dependent rules for determining whether to include display of the respective user menu operations in a user interface, and
a plurality of respective third object types that indicate respective context information dependent rules for display position of the respective visual indicia and/or for display position of the respective menu operations in a user interface;
apply the runtime context information to the respective context dependent rules indicated within the object type information structure to determine which respective visual indicia to display, to determine which menu operations to display and to determine positions of one or more of the visual indicia and menu operations in a user interface; and
a user interface display screen that displays the visual indicia and the menu operations and their positions according to the determinations made using the runtime context information and the respective context dependent rules wherein the user interface display screen displays the menu operations, according to the context information dependent rules for determining whether to include display of the respective user menu operations in a user interface, in response to receiving user input indicating user selection of a respective displayed visual indicia.

12. The computer system of claim 11, a user interface display screen that includes a user menu of operations determined using the runtime context information and the respective context dependent rules, in response to receiving user input indicating user selection of a respective displayed visual indicia.

13. The computer system of claim 11, wherein generating the user interface includes generating the visual indicia in a first determined position in response to first context information and generating the visual indicia in a second determined position in response to second context information;

a user interface display screen that includes visual indicia in a first determined position in response to first context information and generating the visual indicia in a second determined position in response to second context information.

\* \* \* \* \*